Jan. 28, 1969  C. W. TATE, SR., ET AL  3,423,959
FLEXIBLE AND TRANSPARENT LUBRICANT HOUSING FOR UNIVERSAL JOINT
Filed Aug. 30, 1967

INVENTORS
CHARLES W. TATE, Sr.
JAMES F. ROONEY

BY Albert Hopp
ATTORNEY 3,423,959
FLEXIBLE AND TRANSPARENT LUBRICANT HOUSING FOR UNIVERSAL JOINT
Charles W. Tate, Sr., 3222 Georgia Ave. NW., Washington, D.C. 20010, and James F. Rooney, 1110 Offutt Drive, Falls Church, Va. 22046
Filed Aug. 30, 1967, Ser. No. 665,203
U.S. Cl. 64—32
Int. Cl. F16d 3/84
7 Claims

ABSTRACT OF THE DISCLOSURE

A flexible, resilient and transparent lubricant housing of high tensile strength for a universal joint provides protection from failure of the universal joint during high speed operation while permitting observation of the joint while in operation. Opposing terminal wall and stem means integral with the housing provide for taking up most of the stress resulting from the shafts of the universal joint being disposed at varying joint angles.

Background of the invention

Flexible housings for universal joints are not new. However, there is a need to provide a cover for universal joint which enables observation of the universal joint and its lubricant while the universal joint is in running operation. Furthermore, there is a need to provide a high strength lubricant cover for universal joints which operate successfully under load at high r.p.m. and which provides protection of personnel and instrumentation positioned in the vicinity of the universal joint.

Summary

The present invention fulfills the needs discussed in the preceding paragraph in that there is provided according to the invention a sturdy but flexible, transparent lubricant housing for a universal joint, enabling the universal joint to operate visibly in a bath of oil and preventing damage to nearby equipment and injury to personnel from the joint if it fails, especially during high r.p.m. operations. Consequently, the invention affords reduced operating costs, maintenance, repair and damage to equipment located near a universal joint.

According to the present invention there is provided a cover made of high strength elastomeric synthetic plastic in the form of a hollow cylindrical housing having a flexible longitudinal wall and terminal transverse end wall portions of sturdy, thick construction terminating in axially protruding stem portions of rugged construction carried by the respective opposing shafts of the universal joint. Clamp means provided at each of the stem portions carrying said opposing shaft members enable rotation therewith and ensure lubricant-tight integrity of the housing. One of the ends of said housing is comprised of a removable end cap which affords each access to the universal joint therein. The cover as a whole deflects when the universal joint is operating at a working shaft angle, the stress of said shaft being taken up primarily by movement of the rugged stem portions of said housing and secondarily by the flexible side wall of the cylindrical housing which is relatively thin with respect to the end walls of the housing and to the stem portions. Thus, there is afforded by the construction of the present invention a housing which enables considerable latitude of shaft angles within the hollow confines of the housing and which provides for stress reaction primarily in the terminal walls and stem portions of said housing.

Brief description of the drawings

Reference is now made to the drawing in which like numbers are employed to represent like parts and in which.

Description and operation

Figure 1:
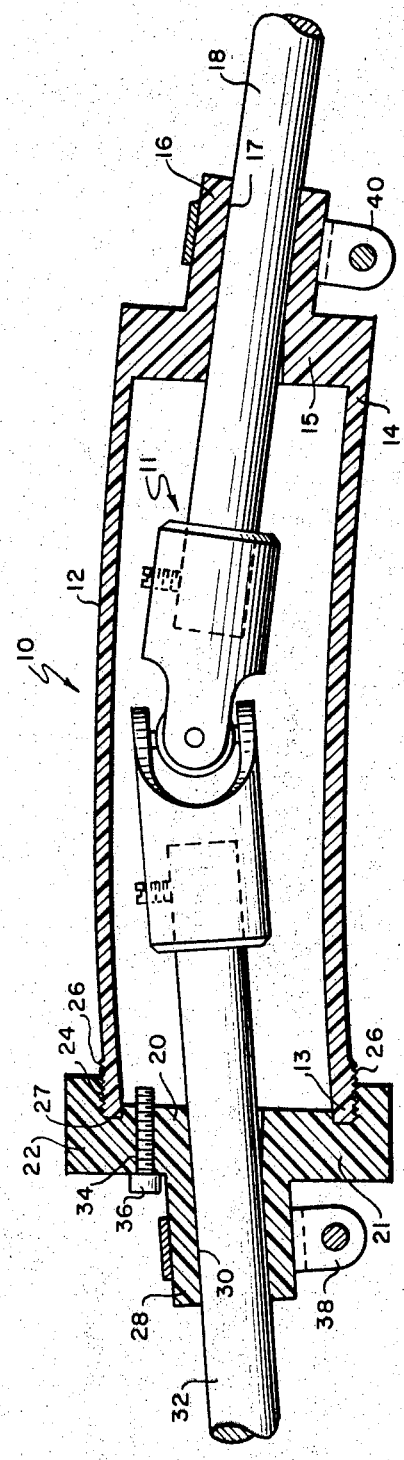
FIG. 1 is a longitudinal cross sectional view of one embodiment of the invention.

Referring to FIG. 1 there is shown a lubricant cover 10 enclosing a conventional universal joint indicated by the reference numeral 11. The cover 10 is comprised of a housing 12 in the shape of an elongated hollow cylinder, one end 13 of which is open and the opposite end 14 of which terminates in a thick transverse end wall 15 having a thick-walled stem portion 16 axially protruding therefrom. The stem portion 16 is provided with a central axial passage 17 extending therethrough for carrying a shaft 18 of one component of the universal joint 11.

The open end 13 of the housing 12 carries a detachable cylindrical end cap 20 which has a thick transverse wall portion 21 and an annular flange portion 22. The inner periphery of the flange portion 22 has a threaded portion 24 for engaging peripheral threads 26 located on the open end of the housing 12. The threads 24 and 26 coact to hold the end cap 20 and the housing 12 together rigidly and in the fluid tight engagement. End cap 20 is also provided with an internal annular recess 27 therein terminating the threaded portion 24 of the wall of the housing 12 so that said end of the housing 12 seats tightly therewithin. The recess 27 adds rigidity to the connection between the end cap 20 and the hollow cylindrical housing 12.

The end cap 20 is provided with a thick-walled axially protruding integral stem portion 28 of unitary construction with transverse wall portion 21. The stem portion 27 has an axially extending central passage 30 therethrough coaxial with passage 17 for receiving a shaft 32 of the other component of the universal joint 11.

The end cap 20 is also provided with a port 34 extending axially therethrough and located between the innermost extensions of the stem portion 28 and of the flange portion 22 enabling the introduction of the lubricant into the interior of the housing without removal of the end cap 20. The port 34 is internally threaded to receive a sealing plug or screw 36 of any suitable metallic or synthetic plastic material.

The end cap 20 and its integral stem portion 28 are fashioned in any suitable manner, e.g. as by molding, so that the wall portions of the stem and cap are of thick or sturdy construction. For example, the stem portions 16, 28 may have a wall thickness of about twice the side wall thickness of the cylindrical housing 12. The transverse wall portion 21 of end cap 20 and the transverse end wall 15 each may have a wall thickness of about at least twice that of the side wall of housing 12.

Clamps 38 and 40 of any suitable conventional construction are provided for the stem portions 16 and 28 respectively to afford squeeze-tight, liquid-tight rigid connections of said stem portions to shafts 18 and 32 of the universal joint for rotation therewith.

The material of which the lubricant housing 10 is constructed comprises Adiprene L–100, a plastic initially in the form of a liquid obtainable under the trademark from E. I. du Pont de Nemours and Co. To one hundred units by weight of the Adiprene L–100 is added 1.1 units by weight of Quadrol (a trademark denoting a material available from Wyandotte Co.) and 11.1 units by weight of phenyldiethanolamine (available from Eastman Chemical Products and from Union Carbide). The three ingredients are then mixed at about 250° until blended. The resulting constituent mixture which has a syrupy texture after mixing is then poured into molds of any suitable design to form the end cap and housing structures shown assembled in FIG. 1, and is cured therein at a temperature of 158° F. for a period of about 4 hours. At the end of four hours the resultant constituent mixture assumes the characteristics of a strong elastomeric solid which exhibits a hardness for about 90 Rockwell Shore A. The molded objects are then further cured at room temperature for a period of about 14 days at which time the objects are completely cured.

As an alternative, a material of satisfactory hardness (about 90 Rockwell Shore A) may be provided by adding to 100 units by weight of Adiprene L-100 11 units by weight of MOCA, a trademark denoting a curing agent commercially available from E. I. du Pont de Nemours and Co.; mixing at about at least 212° F. until blended and curing at about 400° F. for about ½ hour and residually curing for about 14 days at room temperature.

The manner in which the molds are made and the castings produced therefrom conforming to those shown in the drawings is believed well known in the art of plastics molding and is not discussed in detail. It is a primary importance however that in the fabrication of the cylindrical housing and its end cap 20 that the stem portions and the adjacent terminals and flange portions be made of considerable thickness in relation to the walls of the hollow cylinder 14. For example, for a housing of about 2″ overall diameter with a side wall ⅛″ thick, for use with a universal joint having shafts of approximately ½″ diameter each and a coupling of approximately ¾″ to 1″ in diameter, the walls of respective stem portions 16 and 28 have a thickness of about ¼″ and the transverse end walls 15 and 21, a thickness of about ½″.

Figure 2:
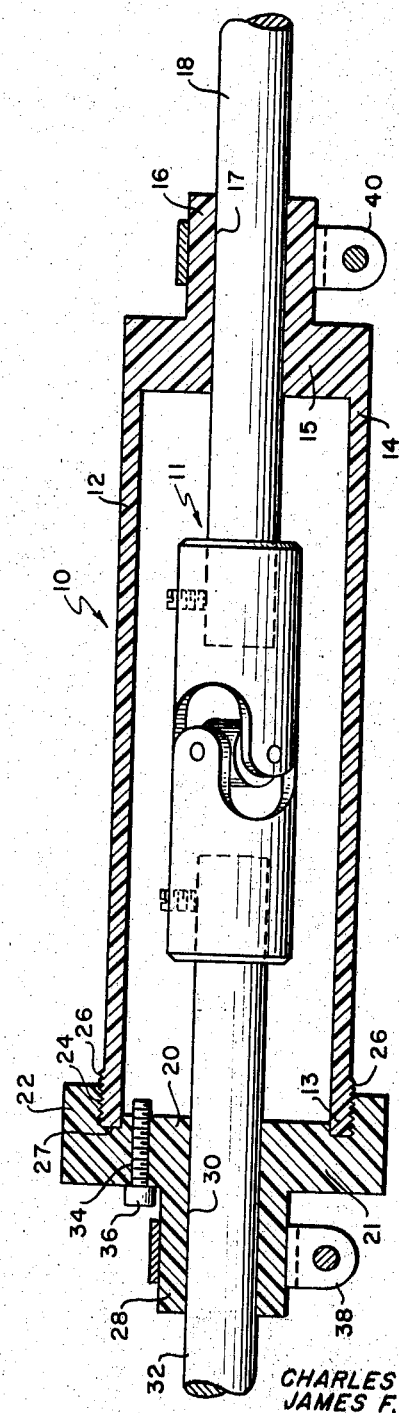
FIG. 2 is a view of FIG. 1 showing the universal joint operating at a working angular displacement of the shafts.

The operation of the present invention may be better understood by reference to FIG. 2 which shows the two shafts of the universal joint operating at an angular displacement from each other. As can be seen from FIG. 2 the angular disposition of shafts 18 and 32 is taken up primarily in the stem portions of end cap 20, stem portions 16 and 28 respectively. That is for the angular displacement or disposition of the shaft 32 it is seen that the stem 28 carrying said shaft is angularly displaced to a greater degree than the remainder of the flexing housing structure such as the transverse wall 21 forming the end cap 20. This phenomenon is due to the elastomeric properties of the foregoing described materials when assembled to form the integral structure of cover 10. Even though stem 28 is distended angularly with the shaft 32 the clamp 38 tightly affixed thereto holds substantially all of the inner surface of the stem in intimate sealing and rotating contact with the shaft 32 thus preventing escape of the lubricant from within the housing. In a like manner the angular disposition of the stem 14 produced by the orientation of the shaft 18 produces the same displacement in relation to the lesser displacement of the thickened transverse wall 15 terminating the closed end of housing 12. Clamp 40, of course, likewise serves to hold substantially all of the inner surface of stem portion 16 in intimate contact with the shaft 18 for rotation therewith and for preventing leakage of lubricant.

As can be seen from FIG. 2 the flexible side wall of the cylindrical housing 10 also takes up a certain amount of stress caused by the annular disposition of the shaft tightly locked or secured to their end portions of the housing. One side of the housing 12 is distorted into a convex shape caused by the pulling of the stem portions 16 and 28 toward each other. However, the foregoing tension results in only a rather slight curvature of the one side of said housing in relation to the angular movements of the stem portions 16 and 28. For example, for an angular disalignment of about three degrees between the shafts 32 and 18 in visible curvature in the wall portion of housing 12 is negligible.

The other side of the housing 10 exhibits a slight concavity which is negligible at about a three degree angular difference between the axes of shafts 18 and 32. For larger angular displacement of said shafts the concavity becomes only barely noticeable.

As can be seen from the foregoing description and operation, the lubricant housing according to the present invention provides the advantage of reacting to the stresses caused by the angularly displaced universal joint shafts at points of maximum structural strength and with minimum structural distortion taking place in the central region of the cylindrical housing. Furthermore, the foregoing described materials are transparent and thus provide for visual monitoring of the universal joint when in operation. Of course, such visual observation reduces or eliminates the need of dismantling the housing in order to observe the universal joint and the lubricating conditions therewithin.

Another important advantage of the present invention is that the walls of the housing 12 are of sufficient tensile strength to restrain fragments of the universal joint should it fail or burst during a high speed run. The high tensile strength of said materials prevents "ballooning" of the cover at high r.p.m.—about 8000 r.p.m. for example.

Dismantling of the cover 10 is carried out by loosening clamp 38 and rotating end cap 22 in relation to shaft 32 and housing 12 so that it separates from the housing 12. The end cap 20 may then be moved axially along shaft 32 away from housing 10 to provide access into the housing. For further access clamp 40 may be loosened and the remainder of housing 12 moved axially in the opposite direction along shaft 18, thus exposing the entire universal joint for observation.

The efficacy of the lubricant cover according to the invention may be supported by the fact that during high speed running at about 6,300 r.p.m., the unit driven by an electric motor and driving a load such as a propeller shaft, in a testing model, with the shaft angles being deliberately misaligned or to cause concurrent wobbling and rotation of the cover 10, the cover did not balloon or fail after many hours of such difficult running. In the above example, the cover was about 8″ overall length, 2″ diameter, with wall thicknesses as previously described above for shafts having ½″ diameter each.

The invention described herein may be manufactured and used by or for the Government of the United States of America for governmental purposes without the payment of any royalties thereon or therfor.

Obviously many modifications and variations of the present invention are possible in the light of the above teachings. It is therefore to be understood that within the scope of the appended claims the invention may be practiced otherwise than as specifically described.

What is claimed is:

1. A cover for a universal joint having a pair of coupling members pivotally connected for rotation about intersecting axes with each of said coupling members adapted to be rigidly coupled to a rotatable shaft, said cover comprising:

elongated unitary housing means in the form of a hollow cylinder enclosing said universal joint, said housing means having a longitudinal side wall of a given thickness, and at one end transverse end wall means of substantially greater thickness than said side wall for dividing one end thereof, the opposite end of said housing being open;

a first stem portion unitary with said transverse end wall means and axially protruding therefrom, said stem portion and transverse end wall means having axial passage means extending therethrough for receiving one of said rotatable shafts of said universal joint;

said stem portion having walls of thickness substantially greater than the side wall of said housing means;

cap means rigidly carried on the open end of said housing means for closing said open end of said housing means, said cap means having a transverse wall portion of thickness substantially greater than that of the side wall of said housing;

a second stem portion unitary with and axially protruding from the transverse wall portion of said cap means, said transverse wall portion and stem portion having axial passage means extending therethrough for receiving the other of said rotatable shafts of said universal joint; and clamp means carried by each of said stem portions for locking both said stem portions to said shafts for rotation therewith and for providing a seal between each of said stem portions and said shafts respectively;

said housing means and cap means being comprised of a transparent and elastomeric synthetic plastic material having a hardness of approximately 90 Rockwell Shore A;

whereby when said shafts of the universal joint are angled with respect to each other, the stresses imposed thereby on said cover are taken up primarily by movement of said stem portions therewith and secondarily by distortion of the side wall of said housing, said cover deflecting as a whole to conform to the working angle of said universal joint.

2. Apparatus according to claim 1 wherein the wall thickness of each of said stem portions is approximately twice that of the side wall of said housing means, and the wall thickness of the transverse end wall portions of said end cap and housing is approximately at least three times that of the side wall of said housing.

3. Apparatus according to claim 1 wherein said cap means is detachable and said cover is provided with engaging means for removably detaching said cap means from said housing means.

4. Apparatus according to claim 1 wherein said cap means includes port means extending therethrough for passage of lubricant into and out of the confines of said housing, and means for sealing said port means.

5. Apparatus according to claim 1 wherein the synthetic plastic material comprises a heat curable mixture of 100 units by weight of Adiprene L–100 and 11 units by weight of MOCA mixed at a temperature of at least 212° F. until blended, and heat cured at approximately 400° F. for about one-half hour and then cured for about 14 days at room temperature.

6. Apparatus according to claim 1 wherein the synthetic plastic material comprises a heat curable mixture of 100 units by weight of Adiprene L–100, 1.1 units by weight of Quadrol, and 11.1 units by weight of phenyldiethanolamine admixed at 250° F., until blended, cured in a mold at 158° F. for about 4 hours, and cured at room temprature for about 14 days.

7. Apparatus according to claim 3 wherein said engaging means comprises a flange on said cap means, and flange having an internally threaded portion and said housing means having an externally threaded portion for engagement with the internally threaded portion of said flange, said cap means having an internal groove for complementary fit with the adjacent extreme portion of said housing means.

References Cited

UNITED STATES PATENTS

| | | | |
|---|---|---|---|
| 2,264,728 | 12/1941 | Stillwagon et al. | 64—32 |
| 2,648,208 | 8/1953 | Stillwagon | 64—32 |
| 2,755,643 | 7/1956 | Wildhaber | 64—32 |
| 3,097,424 | 7/1963 | Martiny | 64—32 X |

HALL C. COE, *Primary Examiner.*